(12) United States Patent
Tuladhar (10) Patent No.: US 6,853,940 B2
(45) Date of Patent: Feb. 8, 2005

(54) ANTI-ISLANDING DEVICE AND METHOD FOR GRID CONNECTED INVERTERS USING RANDOM NOISE INJECTION

(75) Inventor: Anil Tuladhar, Dearborn Heights, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 23 days.

(21) Appl. No.: 10/345,871

(22) Filed: Jan. 15, 2003

(65) Prior Publication Data

US 2003/0165036 A1 Sep. 4, 2003

Related U.S. Application Data

(60) Provisional application No. 60/319,079, filed on Jan. 16, 2002, and provisional application No. 60/319,007, filed on Jan. 16, 2002.

(51) Int. Cl.[7] ............................................. G06F 13/20
(52) U.S. Cl. ..................... 702/111; 702/108; 702/109; 702/124
(58) Field of Search ............................. 702/57, 58, 64, 702/74, 182, 188, 193, 108, 109, 111; 361/62; 307/125; 340/169, 980

(56) References Cited

U.S. PATENT DOCUMENTS

| | | | |
|---|---|---|---|
| 4,878,208 A | 10/1989 | Seki et al. ..................... 307/87 |
| 5,162,964 A | 11/1992 | Higasa et al. .................. 361/20 |
| 5,493,485 A | 2/1996 | Okado .......................... 363/56 |
| 5,686,766 A | 11/1997 | Tamechika .................... 307/43 |
| 5,808,449 A | 9/1998 | Hirayama et al. ............. 322/20 |
| 6,107,784 A | 8/2000 | Nomiya et al. ............. 323/205 |
| 6,172,889 B1 | 1/2001 | Eguchi et al. ................. 363/95 |
| 6,188,145 B1 | 2/2001 | Stewart ....................... 307/125 |
| 6,219,623 B1 * | 4/2001 | Wills ............................ 702/60 |
| 6,429,546 B1 * | 8/2002 | Ropp et al. .................. 307/31 |
| 2001/0056330 A1 * | 12/2001 | Wills ............................ 702/60 |

OTHER PUBLICATIONS

Duo Deng et al., U.S. patent application No. 10/328,934, filed Dec. 23, 2002, entitled "Device and Method for Detecting Islanding Operation of a Static Power Source.".

* cited by examiner

Primary Examiner—Marc S. Hoff
Assistant Examiner—Felix Suarez
(74) Attorney, Agent, or Firm—Seed IP Law Group PLLC (57) ABSTRACT

A device and method for detecting islanding of a grid connected inverter makes use of an injected white noise as a perturbing force on the output voltage of the inverter. The white noise is injected at least once in every cycle and can be generated at different rates in implementation. On loss of the grid, a frequency drift of the output voltage is detected and a positive feedback is activated that accelerates the drift.

28 Claims, 6 Drawing Sheets

ANTI-ISLANDING DEVICE AND METHOD FOR GRID CONNECTED INVERTERS USING RANDOM NOISE INJECTION

BACKGROUND OF INVENTION

1. Field of the Invention

The present invention relates generally to the field of electric power, and more particularly to an anti-islanding device and method for inverters connected to a utility grid.

2. Description of the Related Art

Figure 1:
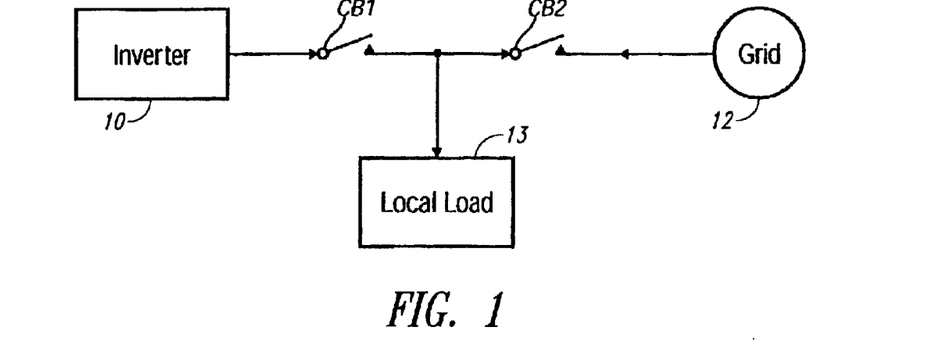
FIG. 1 is a block diagram which shows an example of a connection of an inverter to a utility grid and its local load.

FIG. 1 shows an example of a connection of an inverter 10 to a utility grid 12 and a local load 13. When circuit breaker CB1 is closed and circuit breaker CB2 is open, the load 13 is completely supplied by the inverter 10. When circuit breaker CB2 is closed and circuit breaker CB1 is open, the load 13 is supplied by the grid 12. When both circuit breakers are closed, the load 13 can get power from both the inverter 10 and the grid 12 depending upon the power output of the inverter 10 and the capacity of the load 13 itself. If the output power of the inverter 10 is greater than the capacity of the load 13, the remaining power from the inverter 10 flows to the grid 12 and vice versa. When the power of the inverter 10 matches exactly with the local load 13, the load 13 receives all power from the inverter 10 and the grid 12 simply remains floating. If circuit breaker CB2 is opened, no perturbation in voltage or frequency is observed, because the power balance has not been disturbed. Such a situation where the load 13 remains energized from the inverter 10 is called islanding.

When an inverter is connected to the grid, it is necessary to match the frequency as well as the voltage amplitude with the grid. The inverter uses the grid as the reference and generates an output voltage that is synchronized with the grid. If the grid becomes disconnected, the inverter will continue to supply power if the output power of the inverter matches with the local load demand on the grid since the inverter does not see any change in frequency or voltage. Such a condition is known as islanding, which constitutes a significant issue having substantial safety and performance implications.

For example, islanding results in a degradation of the quality of electricity supplied to the customer during the islanding period due to a lack of utility control. Uncontrolled frequency and voltage excursion can damage customer equipment. Further, if the grid disconnection is the result of a transient fault in the system, interrupting devices will try to re-close the grid connection after a few cycles (typically 12 to 15 cycles). Re-closing can potentially damage the inverter since the voltages in the island are not necessarily synchronized with the grid. When the grid is reconnected, it can have a different phase angle with respect to the islanded voltage, which can cause a large over-current that can damage the inverter already in the system and islanded with the load.

Islanding raises safety implications. For example, when the grid is disconnected to perform maintenance work on its power transmission lines, workers assume that the line is dead and safe to work on. However, the inverters continue supplying power and maintaining the voltage.

In order to address these concerns, an IEEE standard was developed for utility interconnection of PV (photovoltaic) systems, and an Underwriters Laboratories safety standard for photovoltaic inverters was also developed. Both of these standards are essentially the same regarding anti-islanding requirements. There is yet another IEEE standard draft underway to address the issues related to interconnecting distributed resources to the utility grid, which refers to the existing IEEE for utility interconnection of PV systems for anti-islanding requirements. In addressing the islanding issue, an aspect of the proposed standards relates to requiring the inverter to be able to detect the loss of the grid and disconnect as soon as the loss is detected. The standards require the inverter to disconnect within two seconds if the load matches within one percent. These requirements present a challenge to the industry.

Past approaches to anti-islanding involved, for example, either using extra signals, such as low frequency pulses or voltage harmonics, or introducing an explicit positive voltage or frequency feedback technique to detect the grid loss. These methods have serious drawbacks. Periodically injecting a signal can interfere with the grid or the load. For example, the periodic injected signals can sometimes cause resonance. In some instances, the injected signals can cancel each other, rendering the technique useless when multiple inverters are connected together. The frequency or voltage drifting technique uses explicit positive feedback. The change in frequency/voltage is measured and positive feedback is used to drift the frequency/voltage further away. This method is very sensitive to the gain selected for the positive feedback. Too small of a gain can make the system ineffective, resulting in the failure to detect the islanding within the required time frame, while too large of a gain can potentially drive the system unstable. Furthermore, if the load matches very closely with the inverter output, the change in frequency or the voltage may not be detectable. A non-detection zone (NDZ) exists in frequency or voltage drift techniques without active perturbation.

Approaches to deal with the islanding problem arose initially when the problem was first realized with solar power units having inverters which convert solar power into alternating current (AC) power, since solar power units, which have relatively small capacity, were the first to be connected to the grid. Different techniques, most of which are not standard, were used to address the islanding problem with solar power inverters. Some of the approaches use, for example, the injected signal method whereby a spike in voltage is periodically injected. If the grid is connected, the grid clamps the voltage and will not allow it to go beyond a certain point. As soon as the grid is lost, the spike shows up in the output voltage. All such approaches have problems with performance. For example, the injection of a regular periodic signal generates considerable harmonics/sub-harmonics in the system, which can interact with a load. Loads, such as a motor load, typically cannot tolerate very low frequency sub-harmonics. For example, 5 Hz or 10 Hz signals can cause problems in electric motors. In addition, only five percent total harmonic distortion is allowed in voltages, and introduction of the spike in the system may exceed this limit. Further, injected noise can resonate in filters in the system and cause an excessive current.

The approach in which a signal is injected and harmonics are detected in the output when the grid is not electrically present is referred to as an active anti-islanding method. Another approach is called the passive method. This method depends upon the change in voltage and frequency during the islanding condition. If the load mismatches during the loss of grid, then if real power is not matching exactly, there will be a small jump in voltage. Assume, for example, that the inverter is outputting 40 kilowatts to the grid and there is a load of 50 kilowatts in the grid. If the grid was previously supplying 10 kilowatts and becomes disconnected, all 50 kilowatts must come from the inverter. Thus, when the inverter power output increases, this will cause the voltage to drop, the change in voltage will be detected, and there is a positive feedback which accelerates the voltage drop further. If the grid was connected, the grid would have supported it, but if the grid is down, the voltage will start dropping, and that drop can be detected.

The passive method with a voltage drift positive feedback works if there is an imbalance in real power, but if there is an imbalance in reactive power, the current will not be in phase with voltage. Therefore, if there is a small power factor difference, for example, because the load is consuming slightly more reactive power than the inverter is supplying, and the grid will have to supply the difference, when the grid is disconnected, the inverter must supply that, so there is a sudden jump in phase angle between voltage and current. That appears as a frequency jump that can be detected. Whenever there is a sufficient change in frequency, positive feedback steps in and it is amplified further. It is obvious from the above description that the passive technique of voltage and frequency drift will not work if the mismatch in load is not big enough to generate the detectable change in frequency or voltage. The load mismatch within which the islanding is not detected is known as the non-detection zone (NDZ). Because islanding has safety implications, the standards require that islanding must be checked within one percent load matching. Due to the inherent measurement errors, one percent mismatch in load may fall into the NDZ and may not produce any measurable changes in the voltage and frequency.

The prior art techniques need either very accurate voltage and frequency measurements to introduce a positive feedback to drift the voltage or the frequency of the inverter or require the injection of some harmonics in the voltage signal to detect the islanding condition. The positive feedback technique with a very sensitive frequency and voltage measurement scheme with a higher gain can potentially cause instability and still does not guarantee the islanding detection for a perfect load match condition. The injection of voltage harmonics on the other hand can excite some resonance modes in the grid/load. This also affects the grid voltage quality.

BRIEF SUMMARY OF INVENTION

In one aspect, an anti-islanding device and method for inverters connected to a utility grid utilizing random noise injection eliminates a need for correcting the phase angle or the frequency of the inverter at every cycle to match the grid frequency, which greatly improves the harmonic content and direct current (dc) offset of the inverter current.

In another aspect, an anti-islanding device and method for inverters connected to a utility grid utilizes a white noise to perturb the frequency and thus does not introduce any resonance mode to the system which could interact with the load.

In yet another aspect, an anti-islanding device and method for inverters connected to a utility grid utilizes random noise injection in which the rate of detection of islanding can be suitably adjusted to suit a particular need.

In still another aspect, an anti-islanding device and method for inverters connected to a utility grid utilizes random noise injection works well even for an unbalanced grid voltage system.

In yet still another aspect, an anti-islanding device and method for inverters connected to a utility grid utilizing random noise injection is implemented by computer software and thus has great flexibility.

In a further aspect, an anti-islanding device and method for inverters connected to a utility grid utilizes white noise that is generated as a pseudo random signal and can easily be adapted for a multi-unit system as well by using a common noise signal.

In yet a further aspect, an anti-islanding device and method for inverters connected to a utility grid utilizes random noise injection that does not require very precise measurement of the system frequency and is thus less sensitive to numerical error in the calculations.

In yet still a further aspect, an anti-islanding device and method for inverters connected to a utility grid utilizes random noise injection that is also less sensitive to the clock accuracy of the processor in which it is implemented.

In still a further aspect, an anti-islanding device and method for inverters connected to a utility grid utilizes random noise injection in which parameters, such as the gain of the drift (A), the bandwidth of the filters in the self-synchronizing loop, limit on the frequency error step, and the amplitude and rate of generation of the noise can be adjusted to obtain an optimum system.

In yet still a further aspect, an anti-islanding device and method for inverters connected to a utility grid utilizes random noise injection that has a self resetting characteristic which guarantees that the drift accumulation does not affect the normal operation. The drift accumulation prompted by any transient frequency errors will be reset to zero as soon as the normal operating condition prevails.

In one illustrated embodiment, a device and method for detecting islanding of a grid connected power source, such as an inverter, injects, for example, a band limited white noise on the frequency of the output voltage of the inverter with an amplitude that is less than 0.1% (60 mHz). The cumulative effect of the random noise enables the frequency to drift when the grid is disconnected. The white noise is generated, for example, by a noise generator at every 1 ms (adjustable) and is injected as a tri-state number sequence which can assume a positive value, a zero value, or a negative value.

In an embodiment of the present invention, upon a loss of the grid, the injected white noise perturbs the frequency of the output voltage of the inverter at a level that insures a frequency error greater than a predetermined value, such as 0.06 rad/sec/cycle. This threshold on frequency error allows the system to ride through a gradual drift of the grid frequency (0.5 Hz/sec). If the grid is lost, a frequency drift in the output voltage of the inverter away from the grid frequency that exceeds a predetermined level indicative of the loss of the grid is detected. When the grid loss is detected, a positive feedback loop is activated to accumulate the frequency drift by a digital integrator. The digital integrator uses a drift accumulation algorithm to activate the positive feedback when the change in frequency exceeds, for example, 0.06 rad/sec/cycle.

Additional novel features, advantages and objects of the invention will be set forth in part in the description which follows, and in part will become more apparent to those skilled in the art upon examination of the following, or may be learned by practice of the invention.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a through understanding of various embodiments of the invention. However, one skilled in the art will understand that the invention may be practiced without these details. In other instances, well-known structures associated with electrical circuits and circuit elements have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising," are to be construed in an open, inclusive sense, that is as "including, but not limited to."

The below teachings make use, for example, of frequency drift but with an injection of white noise. The white noise acts as an injected signal, but since it is white noise it does not create any "color" or harmonics in the system. Further, its amperage is so small that it does not interfere with the performance of the system. Thus, the white noise is used as the perturbing force. The white noise is injected and can be generated at different rates in implementation. The disclosed methods and apparatus employ detection of a frequency jump and acceleration of that jump using positive feedback. The injected noise ensures that there is a frequency jump even if the load matches exactly with the inverter output power. A constant noise is used in the system that is random in nature, so in one cycle, the frequency may be put slightly higher, and at another cycle the frequency might be put slightly lower. This ensures that there will always be a detectable error in frequency when grid is disconnected.

The method may be characterized as an active method because noise is being injected. However, because it is a white noise, it does not cause resonance, and it does not cause other harmonic effects which could affect the load, such as a motor. In fact, it has been determined that when use of white noise is implemented, less than 0.1% (60 mHz) is required which is less than the inherent noise in the system itself (unfiltered). The white noise is a PRN signal (pseudo random number) that is truly random in a spectrum point of view. By controlling its initial point, it can be predicted how randomly it is inserted. Thus, an advantage for a multi-unit mode is that the same initial conditions can be set on all the units and the noise can be generated in perfect synchronization. Another option for the multi-unit system implementation is to use a common PRN signal.

Figure 2:
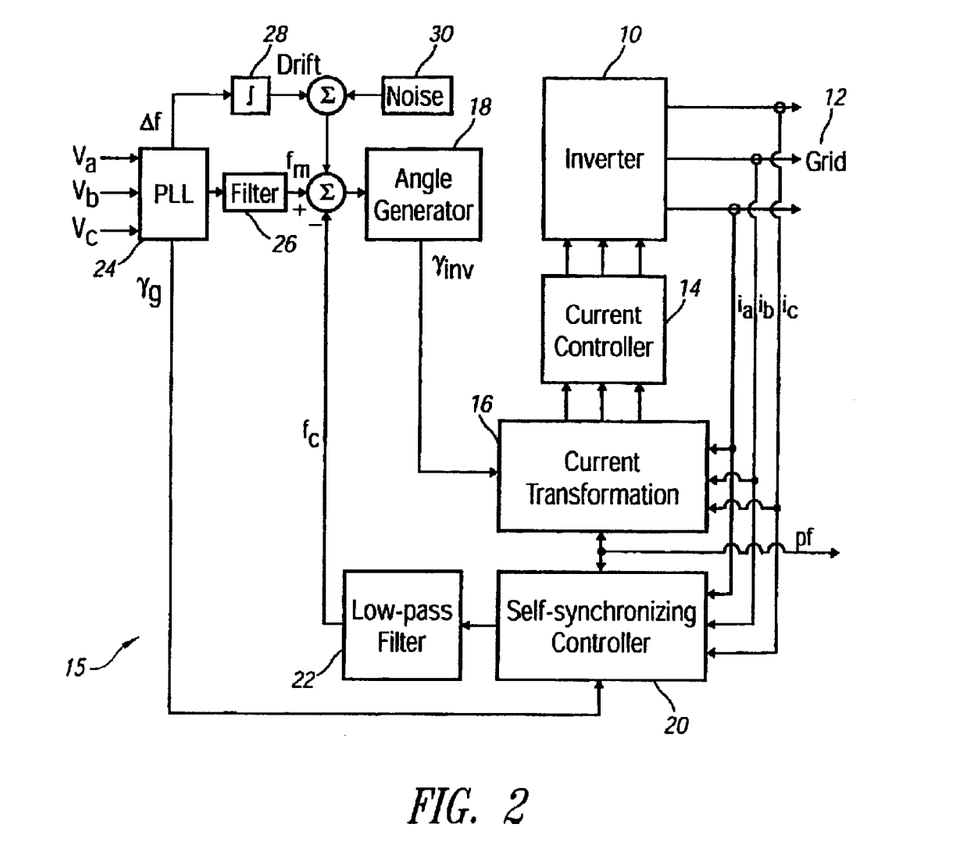
FIG. 2 is a block diagram which illustrates an example of components, some of which are key components and some of which are optional components, of the anti-islanding device utilizing random noise injection for an embodiment of the present invention.

FIG. 2 shows one exemplary embodiment of an anti-islanding device 15 utilizing random noise injection. Some of the illustrated components are optional. The device 15 is used with an inverter, for example a three-phase inverter 10 consisting of six switches, and a utility grid 12. A gating pattern generated by a current controller 14 controls the turning ON and OFF of these switches to synchronize the output of the inverter 10 with the amplitude, phase and frequency of the grid 12. The current controller 14 compares the reference value of a dq component of the current with an actual dq component of the inverter current. Two PI controllers are used to force these errors to zero. The reference dq component of the current is obtained by using information regarding the power output, the grid voltage amplitude and the desired power factor. The dq of the actual current is obtained from a current transformation component 16. The current transformation component 16 uses an abc/dq transformation of the inverter current to obtain the actual dq component of the inverter current. Angle information required for the transformation is obtained from an angle generator 18.

Referring further to FIG. 2, a self-synchronizing controller 20 calculates the power factor of the inverter 10 and compares it with the desired power factor. The difference between these two quantities is multiplied by a gain and output as the compensating signal $f_c$. A simple low-pass filter 22 coupled to the self-synchronizing controller 20 is capable of a bandwidth adjustment from 30 Hz to 300 Hz. The three-phase grid voltages $V_a$, $V_b$, $V_c$ are input to a phase lock loop (PLL) 24 and first transformed into dq components. Using these dq components, the phase angle is calculated as follows:

$$\gamma_g = \tan^{-1}(Vq/Vd)$$

A PI controller locks the internally generated voltages $V_{qe}$ and $V_{de}$ with the grid voltages $V_{qg}$ and $V_{dg}$. The PI controller output is integrated to obtain an estimated angle of the grid 12 which eventually locks with the grid angle. Thus, the PI controller output represents the grid frequency. The PLL 24 also takes into account the phase shift introduced by the sampling effect (one sample delay). The ripples in the frequency measurement due to load imbalances or other noises are filtered out by a filter 26 coupled to the PLL 24.

Referring further to FIG. 2, the following pseudo code explains the operation of a digital integrator 28 coupled to the PLL 24:

IF Δf>0.06 THEN
   Drift=Drift+A. Δf
ELSE
   Δf=0;
   Reset Drift to zero;
End Note that the frequency error in normal operating condition will be less than 0.06 rad/sec/cycle. So the reset algorithm resets Drift to zero in normal operating conditions.

The angle generator 18 generates the phase angle for the inverter current by integrating the frequency information of equation 4 below. The angle generator 18 also generates the initial angle to reduce the initial transients. A random noise generator 30 generates a band limited white noise. The random sequence generation is explained by the following pseudo code:

$$Noise=rand(\ )MOD3-1;$$

Where rand( ) function generates a random number which lies between 0 to 32767. It is then divided by 3 to get the remainder, which will be either 0 or 1 or 2. Deducting 1 from the remainder yields −1 or 0 or +1.

The device 15 and method does not inject any particular harmonics to the system but instead uses a band limited white noise to perturb the system. A feature of the device 15 and method is an algorithm for accumulating the frequency drift, which avoids positive feedback until the change in frequency is sufficiently high (>0.06 rad/sec/cycle). As soon as the grid 12 is lost, the noise ensures that the frequency deviation will be more than 0.06 rad/sec/cycle. The detection of the frequency deviation activates the positive feedback loop, and the frequency starts to drift away. The error accumulation algorithm allows the gain in the positive feedback loop to be kept sufficiently small so that it does not interfere with the normal grid operation. This technique also ensures that the natural drift in the grid frequency (<0.5 Hz/sec) does not excite the positive feedback loop.

An aspect of the device 15 and method involves an option of using a self-synchronizing method which ensures that the inverter 10 is always synchronized to the grid 12. Any variation in the grid frequency is measured by using the PLL 24. If the change is smaller than a predefined value (0.06 rad/sec/cycle), it is treated as the grid drift, so no positive feedback is used. As soon as the grid 12 is lost, the grid frequency changes due to the mismatch in the reactive power. If the observed deviation in frequency is higher than the predefined value, the positive feedback loop kicks in, and the frequency starts drifting progressively. However, if the load 13 matches exactly with the inverter power, the change in frequency can be very small. To rescue the system from such a situation, a white noise is added to the frequency reference of the current control loop. When the grid 12 is present, this noise will not be able to change the grid frequency significantly. However, as soon as the grid 12 is lost, the noise will drive the frequency away from the nominal value. The positive feedback loop then drives the frequency further away.

One aspect of an embodiment of the device 15 and method involves the use of a small white noise to perturb the frequency of the inverter 10. Since the noise is white, it does not introduce any particular frequency that can cause resonance, and since the noise is very small (less than 0.1%), it does not affect the grid voltage quality significantly. The drift accumulation algorithm allows the use of small gain for the positive feedback loop while ensuring drift, if any, occurs within the required time frame. The optional self-synchronizing controller also helps to perturb the system frequency easily once the grid 12 is lost. The device 15 and method is able to detect the islanding condition in all types of loading conditions and power factors.

In an aspect of the present invention, the measured frequency $f_m$ is filtered to attenuate ripples by passing it through the optional low-pass filter 26. The digital integrator 28 calculates the phase angle of the inverter current using the measured frequency. The computational error, aliasing effect, and the error inherent to the clock of the processor which implements this algorithm causes the measured frequency to differ slightly from the grid frequency. This small difference in frequency integrates over time and gives rise to a phase drift. This phase drift causes the current to drift away from its desired angle (power factor).

The optional self-synchronizing controller 20 resolves this problem. The deviation in power factor from the desired value is used to generate a compensating signal $f_c$ which adjusts the frequency of the inverter 10 in the correct direction to avoid the phase drift. With this modification, the frequency of the inverter 10 becomes:

$$f_{inv}=f_m-f_c \qquad \text{(Equation 1)}$$

Note that there is an optional low-pass filter 22 in the $f_c$ loop, so any error in frequency will not be corrected instantaneously, but only after a small time delay. With this technique, the inverter 10 is able to lock with the grid 12 and supply power at a desired power factor without needing to correct its frequency at every cycle. This improves the harmonic content and reduces the dc component of the inverter current.

The PLL 24 also keeps track of the frequency error Δf at every cycle. This frequency error Δf is accumulated by the digital integrator 28 if its magnitude is greater than 0.06 rad/sec; otherwise the error is set to zero and accumulated drift is also ramped down to zero. This ensures that there is no interference with the normal operation of the grid 12 when the grid frequency does not vary significantly. The band of 0.06 rad/sec also allows the grid frequency to drift naturally at a rate of 0.5 Hz/sec without stimulating the positive feedback loop. The accumulated error (i.e., Drift) is calculated as follows:

$$\text{Drift}=\text{Drift}+A.\Delta f \qquad \text{(Equation 2)}$$

Drift is accumulated at every sample, but Δf is only calculated at every cycle. Thus, any deviation observed in frequency (>0.06 rad/sec/cycle) produces a drift of A*Δf*N rad/sec extra change in frequency, where N is the number of samples/cycle, and A is the gain of accumulation. For A=0.01 and N=67, the extra frequency shift is 0.033 rad/sec at the end of a cycle for an error of 0.06 rad/sec/cycle. The Drift is added to the inverter frequency to yield the following:

$$f_{inv}=f_m+\text{Drift}-f_c \qquad \text{(Equation 3)}$$

This algorithm enables drifting the frequency quickly, if there is a sufficient change of frequency (>0.06 rad/sec/cycle) whenever the grid 12 is lost.

However, when the load 13 matches closely with the power output of the inverter 10, the loss of the grid 12 will not produce any significant deviation in the frequency, so there can be a failure to detect islanding in such scenarios. To address that situation, an embodiment of the present invention adds the random white noise to the frequency signal. The modified frequency reference for the inverter is given by:

$$f_{inv} = f_m + \text{Drift} - f_c + \text{noise} \qquad \text{(Equation 4)}$$

The amplitude of the noise is limited to 50 mHz, which is less than 0.1% of the nominal value. This noise is generated at a desired rate (e.g., every 1 ms). If the grid is present, this noise will not be able to produce any significant deviation in the frequency due to the clamping effect of the grid 12 (i.e., low impedance). Hence, the system keeps running without any drift. As soon as the grid 12 is lost, the noise will perturb the frequency. The drift will build up causing the frequency to drift away.

The noise used may be a tri-state number sequence. It can assume a positive value, a zero value, or a negative value. The drift acts like a memory and remembers the effect of the last random number. Since it is a random event, another random number can be the same as the last random number, or a zero random number, or of the opposite sign to the last random number. The drift will continue to grow even if the next random number is zero. It will grow faster if the next random number is the same as the previous random number. It will be reset only if the next random number is of the opposite sign. Since the chance of getting another number as zero or of the same sign is twice as great as getting the opposite number, the Drift will eventually build up, drifting the frequency away.

Referring once more to FIG. 2, it will be appreciated that the self-synchronizing controller 20 and filters 22 and 26 are optional features. Thus, in this optional embodiment, three voltages are received from the grid current as input to the self-synchronizing controller 20, and the angle information is generated. However, in a basic embodiment the raw frequency from the PLL 24 can be used directly for angle generation, although the self-synchronizing controller 20 and filters 22 and 26 can optionally be used to get perfect frequency information from the grid 12.

In another aspect, an objective is to lock inverter frequency information with the grid 12. The grid voltages are measured, and its frequency is measured accurately. The PLL 24 and the filter 26 may be used to obtain the frequency, because the PLL 24 will always lock with the grid 12. The filter 26 eliminates or reduces the extraneous noise. However, when operating in digital mode with the filter 26, some offset to that information is always introduced due to numerical inaccuracies and sub-sampling effect (aliasing effect). In that way, the frequency information $f_m$ from the filter 26 will not exactly match with the grid frequency, and can have a small offset on it. Secondly, the angle will not be phased with the inverter output directly because the PLL 24 loop generates this frequency, and the frequency is used to generate the angle by integrating it. The angle generator 18 integrates the frequency to generate the angle information.

When use is made of the PLL 24 output of the frequency directly, the inverter 10 can be used to switch it so that it is perfectly in phase with the grid 12. Another method employs a compensating loop. In the compensating loop, the generated frequency information may have some offset, and the initial phase angle may not be the same as the grid 12. If the frequency or phase angle are not exactly in phase with the grid voltages, a power factor difference exists because there is an angle between voltages and current, which implies some reactive power. The optional self-synchronizing controller 20 can keep track of that power factor and determine when the inverter 10 is not synchronized with the grid 12. If the desired power factor is unity, but because of the angle difference, there is a slight error in the power factor that is not desired. An error signal $f_c$ is generated which attempts to bring that frequency back. Thus, it operates in a similar fashion to a feedback controller in that it is looking at the desired power factor, and an error signal is generated when there is a deviation.

In further aspect, an additional synchronizing technique involves natural tendencies because frequency is used as a control parameter, and the phase angle is the integral of frequency. If there is no difference in frequency, the angle between the phases will remain constant. However, if there is a difference in frequency, then they will start to drift apart, and the angle between the two will keep on increasing. Because the reactive power increases as the angle increases, and the frequency is adjusted as a function of this reactive power, the frequency is changed back. The feedback automatically compensates for whatever error there is in the frequency. The gain in the control loop decides the phase angle error in the equilibrium.

As mentioned, an embodiment of the device 15 and method completely omits the self-synchronizing controller 20 and filters 22 and 26 and simply uses information from the PLL 24 directly, because the PLL 24 locks with the grid 12 and generates angle information. While the PLL 24 can be used directly, it is slightly noisy. An idea is to generate a signal which is locking with the grid 12, so the PLL 24 will reflect whatever the grid 12 is doing. Use of the self-synchronizing controller 20 and filters 22 and 26 produces cleaner output, but is not necessary to the device 15 or method.

Where the PLL 24 output is used directly, the three-phase voltages $V_a$, $V_b$, $V_c$ are supplied to the PLL 24, which generates the frequency and phase angle information. That information is used to switch the inverter 10 directly. In this aspect, the output from the PLL 24 may be supplied to the current controller 14 to control the inverter 10. The drift, which is the output of the digital integrator 28, and the noise which is the output of the random noise generator 30, are added to that frequency information. Thus, the PLL 24 is generating its phase and frequency information and furnishing that to the current controller 14 for generating the inverter switching. Noise is introduced to the PLL 24, so the PLL 24 works with the grid 12. The PLL 24 has its average value of frequency fixed with the grid 12, and the frequency of the grid 12 is always tracking, but the frequency and phase angle are being perturbed with noise. In an aspect of the present invention, the random noise from the random noise generator 30 can be injected directly to the PLL 24.

Using the PLL algorithm, the PLL 24 locks with the grid 12, but after locking random numbers are added which makes the PLL output noisy. Since the PLL output is noisy, the current controller 14 is noisy, and thus the inverter current in every cycle may not exactly match with the grid voltage. For example, in one cycle the inverter current can be slightly lagging, and in another cycle it can be slightly leading. Since the error is so small, such as 0.1%, the noise should not have any effect on the power factor. This is advantageous because it is random, but even in one per cycle, the error is less than 0.1%. While the error is so small as to be not readily noticeable, as soon as the grid 12 is lost the frequency will jump in that cycle, notably increasing or decreasing.

An additional aspect of the disclosed device 15 and method involves, for example, a self-resetting mechanism.

The subject method and device 15 starts accumulating the drift when the frequency error exceeds a predetermined value (0.06 rad/sec/cycle). An assumption in that regard is that the frequency error greater than 0.06 rad/sec/cycle occurs only during the islanding condition, which is not strictly true. During the start-up of the inverter 10 and during transient changes in the grid 12, the frequency error can exceed this predetermined error for a cycle or two. When this happens, the drift mechanism will start accumulating the drift. Since this is a transient phenomenon, the frequency error will eventually become less than 0.06 rad/sec/cycle. However, the digital integrator 28 will cause the drift to have some value which will affect the inverter frequency. The reset algorithm for an embodiment of the present invention takes care of this problem. The reset algorithm becomes active as soon as the frequency error is below 0.06 rad/sec/cycle. In the reset algorithm, the drift is progressively made smaller and smaller until it resets to zero.

The drift mechanism and the reset mechanism work in concert to handle the transients as well as the islanding conditions. As soon as the frequency error exceeds a predetermined level, the drift mechanism tries to force the frequency off, but being an integrator, it drifts off slowly at first. If the change in frequency was due to a transient phenomenon, the frequency error will not be sustained. Thus, the drift soon stops growing but remains constant at this value even when the frequency error becomes zero. The reset algorithm then comes into play to bring the drift to zero in a gentle way (decreasing slowly). Thus, the subject method and device has the ability to withstand transient behavior and at the same time guarantees the detection of islanding in a desired time frame.

A further aspect involves, for example, a limit to be imposed on the maximum frequency error. When the drift builds up, the frequency error at every new cycle tends to increase progressively. This creates a tendency toward making the drift exponential. However, in this aspect, by saturating (limiting) the frequency error to a maximum value, the drift will be a linear function of time. This also helps to control the drift rate by setting the maximum frequency error limit.

It is to be understood that this discussion of use of the frequency drift technique is not intended to be limiting. For example, it will be appreciated that the subject method and device is equally valid for a voltage drift technique as well.

Figure 3:
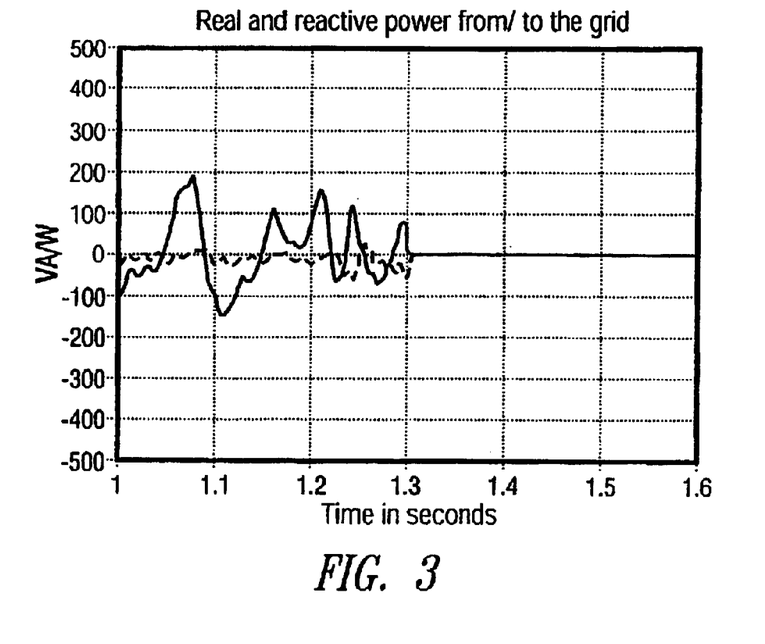
FIG. 3 is a plot which shows an example of real and reactive power flowing to/from the grid as a function of time in a trial using an inverter connected to a balanced grid and commanded to output power at a unit power factor.

Simulation results, plots for which are illustrated in FIGS. 3–10, show that the subject device and method is able to detect the islanding condition in all situations of load mismatch and grid voltage conditions. In one simulation, plots for which are shown in FIGS. 3–6, the inverter 10 is connected to a balanced grid 12 and commanded to output power at unity power factor. The load 13 is matched completely to the inverter output. FIG. 3 shows the reactive and real power flowing to the grid 12. Since the load 13 matched very well with the inverter output, the only reactive or real power flow to the grid 12 is due to the injected white noise. The grid 12 is disconnected at 1.2 seconds. The subject device and method drifts the frequency away from the nominal value. The rate of drifting can be controlled by controlling the gains and the limit on the frequency error. It is observed, for example, from FIG. 6, that the frequency changed from 377 rad/sec/cycle (60 Hz) to 360 rad/sec/cycle (57.3) in less than 2 seconds, which meets the utility regulations.

With regard to balancing the grid 12 with a unity power factor, which is the general case, if the grid voltage is balanced and the unity power factor is the desired power factor, the inverter 10 should not output any reactive power, but it should output real power. Referring again to FIG. 3, the plotted curve with the larger amplitude is reactive power, and the one with the smaller amplitude is the real power. This plot shows that even for a truly islanding condition, the grid 12 is outputting some random reactive and active power. That is the reason that when the grid 12 is disconnected, there will be small change in frequency. Assume that in the islanding condition, 40 kilowatts circuit power is being commanded to the system, and the load 13 is exactly 40 kilowatts on the grid 12. Power is being supplied to the grid 12, but the grid 12 is taking 40 kilowatts from the inverter 10, and the grid 12 is supplying 40 kilowatts to the load 13. In that situation, the grid 12 is doing nothing. All the inverter power goes to the load 13 directly, and the grid 12 is neither taking nor outputting any power, so it is simply floating. If the grid 12 is disconnected, no change will be seen, and that is a problem if no noise is injected.

In the active method utilized with the device 15, the load 13 is adjusted exactly matching with the inverter output, but still a very small amount of random power is seen going to the grid 12. Referring again to FIG. 3, it can be seen that the maximum amplitude of the random reactive power is only about 200 VA and that the real power is almost zero. However, there is a very small white noise in the reactive power that is the main aspect of the subject device and method. The grid 12 will see that small random white noise coming into it in real and reactive power, which is much smaller. In the plotted simulation, 75 kilowatts was used, so that out of 75 kilowatts, the white noise is only 200 VA, which is sufficient for the subject, device and method. After 1.2 seconds, when the grid 12 is disconnected, the plot shows the small power continuing because the inverter 10 has not shut down yet.

Figure 4:
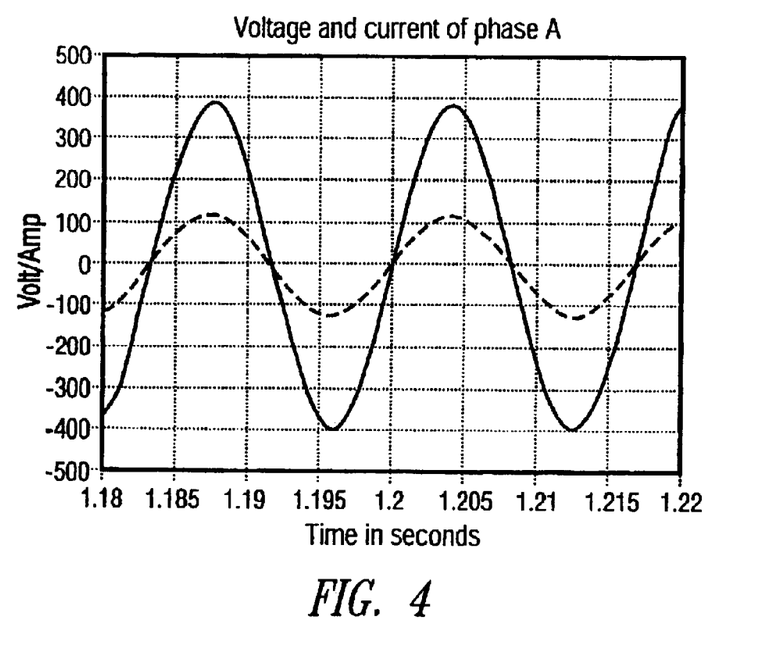
FIG. 4 is a plot which shows an example of voltage and current of a phase A as a function of time in the trial of FIG. 3.
Figure 5:
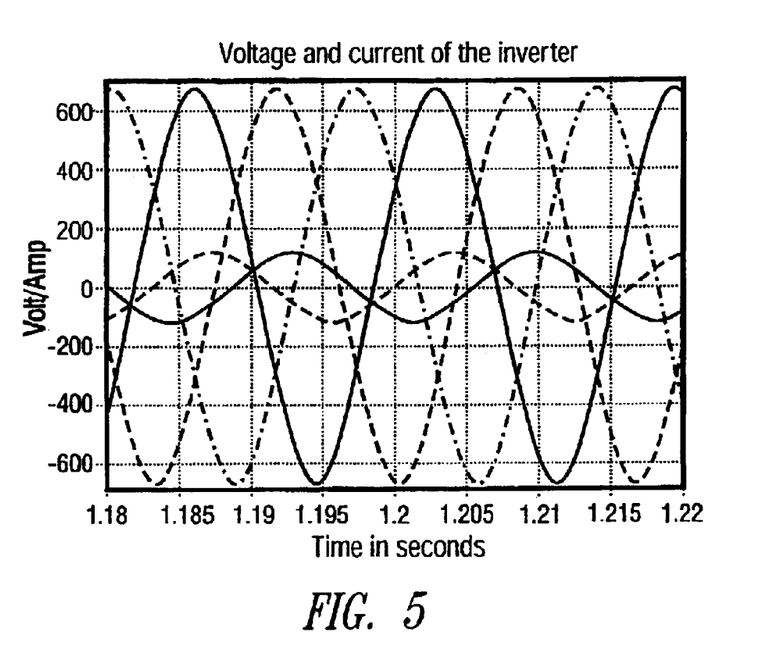
FIG. 5 is a plot which shows an example of voltage and current of the inverter as a function of time in the trial of FIG. 3.

In FIG. 4, the larger amplitude of around 400 V is the voltage, and the smaller amplitude is the current about 110 A is the current in ampere s.

Figure 6:
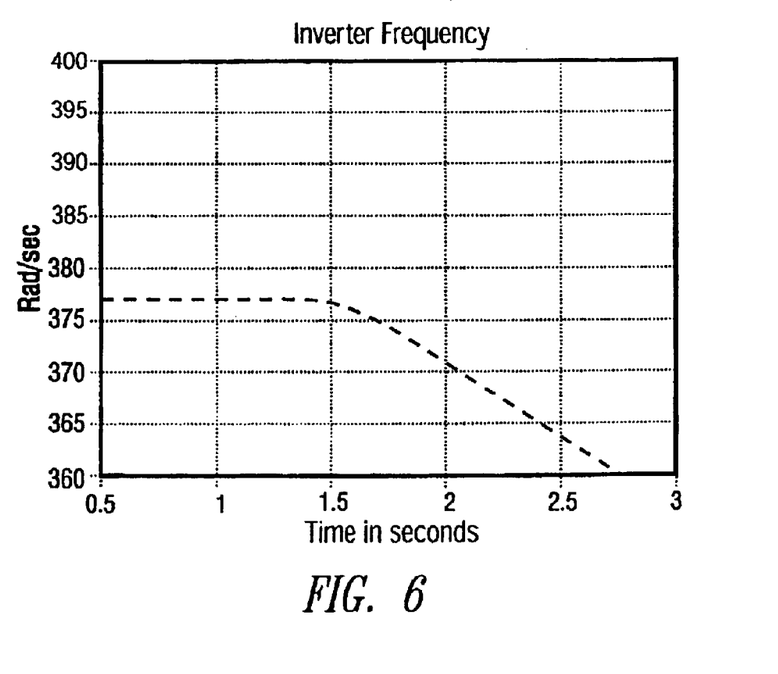
FIG. 6 is a plot which shows an example of inverter frequency as a function of time in the trial of FIG. 3.

FIG. 2 shows that it is necessary to supply the unity power factor, and that the disclosed method and device does not interfere with that. The voltage and current are perfectly in phase, and the disclosed method and device does not interfere with the performance, the power factor being the key. The plot of FIG. 4 shows that after islanding at 1.2 seconds, there is still no significant change in voltage and current. The inverter 10 is still supplying power and islanding for awhile. Voltage and current that is too large or small to disrupt other things is not being pushed. In other words, the amperage is not going extremely high or low, and the frequency is silently being changed. Referring to FIG. 6, it can be seen that the frequency is drifting down. In that way, the frequency drift can be detected very smoothly, and the speed of the drift can be controlled by controlling the gain, and the maximum limit on the frequency error in the drift mechanism. FIGS. 3–6, illustrate that in balanced conditions, with very little white noise injected, it is still detected within the time frame within which detection is required to be done.

Figure 7:
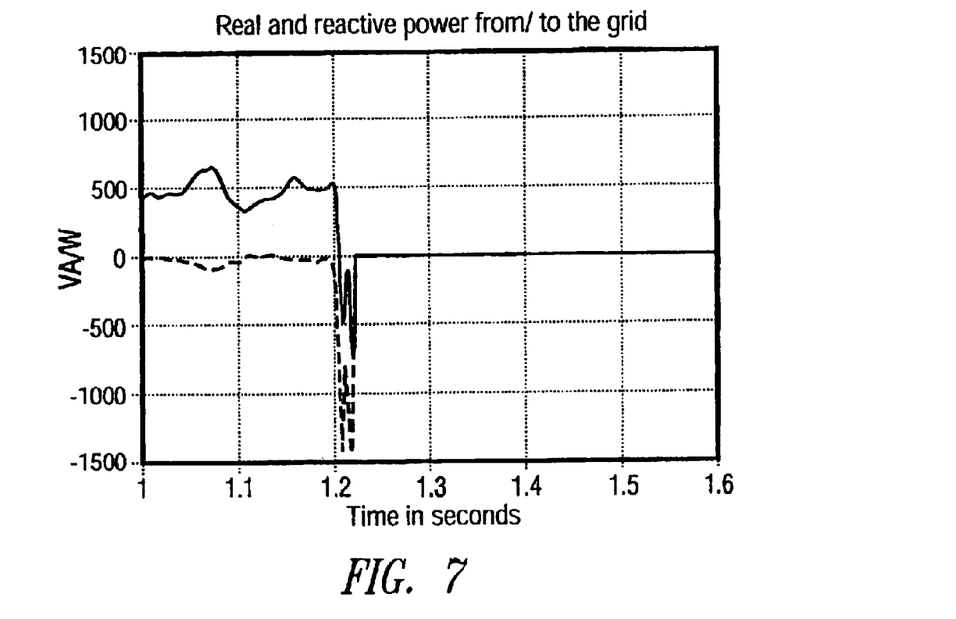
FIG. 7 is a plot which shows an example of real and reactive power flowing to/from the grid as a function of time in a trial using an inverter connected to an unbalanced grid and commanded to output power at a 0.9 inductive power factor.

In another simulation, plots for which are shown in FIGS. 7–10, the inverter 10 is connected to an unbalanced grid 12 with a 3 percent variation in its phase voltages and commanded to output power at 0.9 inductive power factor. The grid 12 is also outputting a small reactive power (<600 VA). The grid 12 is disconnected at 1.2 seconds. Some transients in power are observed during the loss of grid 12. FIG. 7 illustrates that if there is an imbalance in voltage by 3 percent, the grid voltage is off by 3 percent. The grid 12 is outputting a small reactive power because the inverter 10 is balanced, but the grid 12 is not balanced. Reactive power of 500 VA is seen going to the grid 12, while the grid 12 is supplying 500 VA of reactive power, but it is still has a small amount of white noise on it. At the islanding point, a large jump is seen in reactive power because of the phase difference. In other words, the inverter current is not in phase with the voltage of one of the phases. It is possible to balance for one phase but not for all three phases, because of the grid imbalance. Thus, a jump in frequency is always seen, and that causes a phase angle difference, which causes the power surge. That is unavoidable, and useful because it can easily be detected with the disclosed active method.

Figure 8:
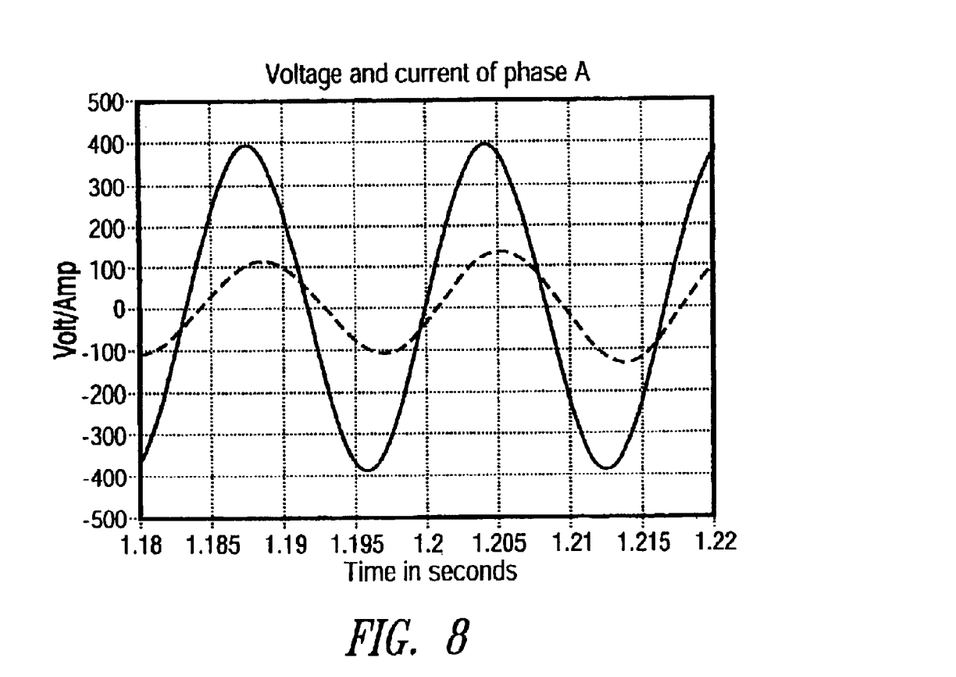
FIG. 8 is a plot which shows an example of voltage and current of a phase A as a function of time in the trial of FIG. 7.
Figure 9:
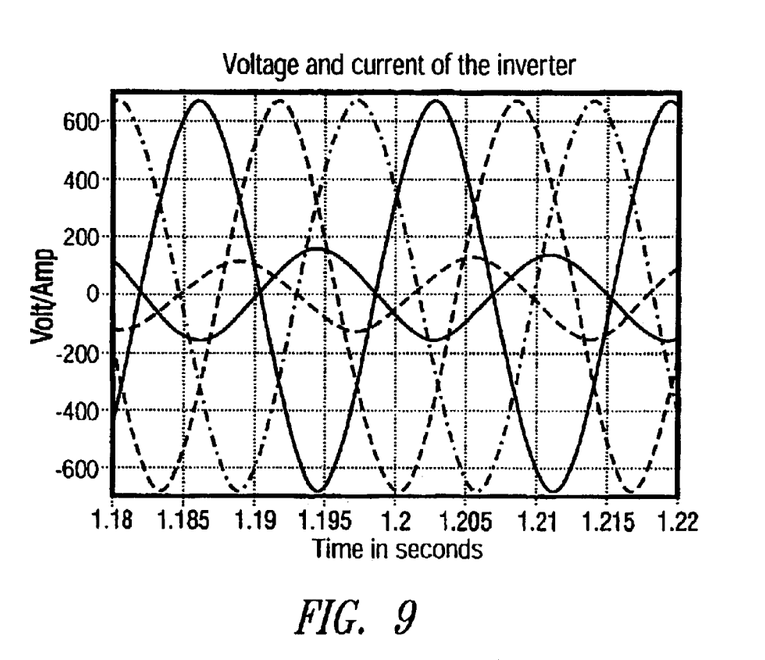
FIG. 9 is a plot which shows an example of voltage and current of the inverter as a function of time in the trial of FIG. 7.
Figure 10:
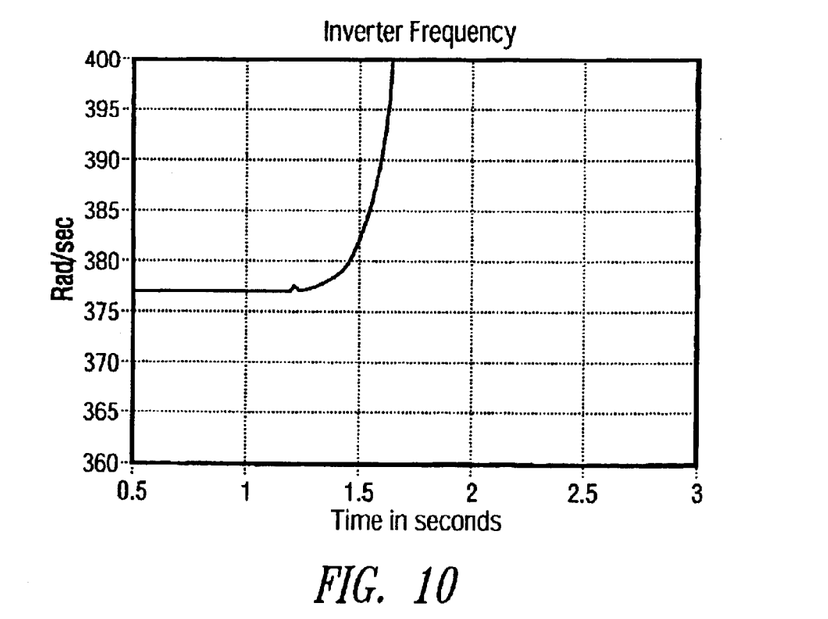
FIG. 10 is a plot which shows an example of inverter frequency as a function of time in the trial of FIG. 7.

FIG. 8, shows that because the power factor desired in this case is 0.9, the current is lagging the voltage and is imbalanced. As soon as islanding occurs at 1.2 seconds, a small rise is seen in current amplitude. Referring to FIG. 9, looking at the current and voltage of the inverter 10, it is seen that before islanding, the phase A current is clearly different from the phase B current and the phase C current. The phase C appears to be the largest because of the imbalance in voltages, but as soon as islanding occurs at 1.2 seconds, all three currents are balanced. When islanding occurs, because the inverter 10 is now supplying the power and the grid 12 is disconnected, a balance can be seen in the phases, since the imbalance was in the grid. FIG. 10 shows that the inverter frequency drifted upward from 377 rad/sec/cycle to 400 rad/sec/cycle within one second.

Figure 11:
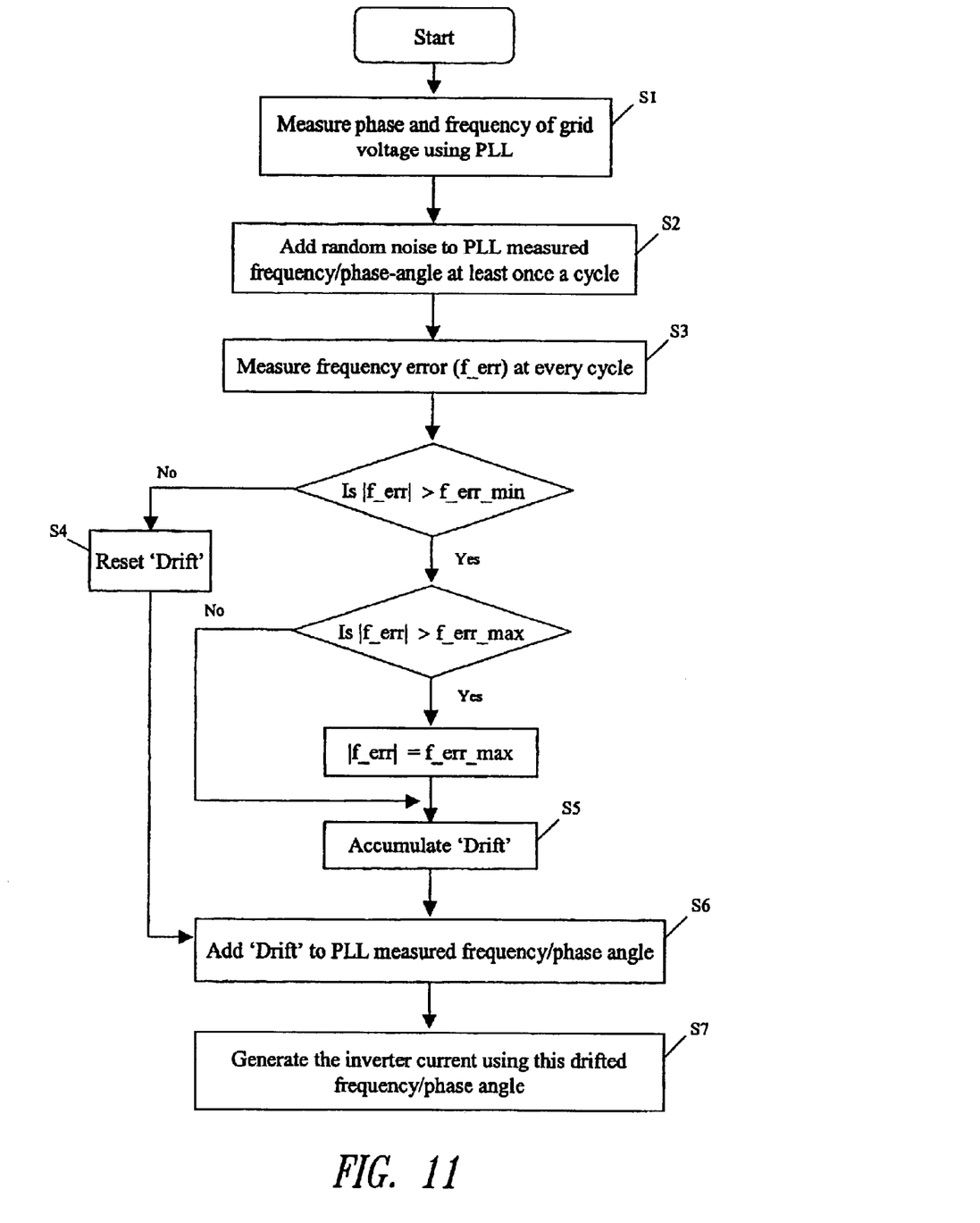
FIG. 11 is a flow chart which shows an example of the process of detecting islanding of a grid connected inverter utilizing random noise injection for an embodiment of the present invention.

An exemplary overview of the process of detecting islanding of a grid 12 connected inverter 10 utilizing random noise injection for a disclosed embodiment is illustrated in FIG. 11, in which the phase angle and frequency of the grid voltage are measured using the PLL 24 at S1. At S2, random noise is added to the PLL-measured frequency/phase angle at least once each cycle. At S3, the frequency error is measured at every cycle, and if the frequency error is not greater than a predetermined minimum value, the drift is reset at S4, and the drift is added to the PLL-measured frequency/phase angle at S6. If the frequency error is greater than the predetermined minimum value but not greater than a predetermined maximum value, the drift is accumulated at S5 and likewise added to the PLL-measured frequency/phase angle at S6. If the frequency error is greater than the predetermined minimum value and greater than the predetermined maximum value, the frequency error is limited to the predetermined maximum value, the drift is likewise accumulated at S5 and added to the PLL-measured frequency/phase angle at S6. At S7, the inverter current is generated using the drifted frequency/phase angle.

All of the above U.S. patents, U.S. patent application publications, U.S. patent applications, foreign patents, foreign patent applications and non-patent publications referred to in this specification and/or listed in the Application Data Sheet, including, but not limited to U.S. Ser. No. 60/319,079, filed Jan. 16, 2002 U.S. Ser. No. 60/319,007 filed Jan. 16, 2002 and U.S. Ser. No. 10/328,934 filed Dec. 23, 2002, via Express Mail No. EV897895054UC5 and entitled "DEVICE AND METHOD FOR DETECTING ISLANDING OPERATION OF A STATIC POWER SOURCE", are incorporated herein by reference, in their entirety.

What is claimed is:

1. A method for detecting islanding of an inverter connected to a grid, the method comprising:
    injecting a band limited white noise on an output voltage of the inverter at least once in each voltage cycle;
    perturbing a frequency of the output voltage of the inverter by the injected noise upon a loss of the grid; and
    detecting a frequency error in the output voltage of the inverter that exceeds a predetermined level indicative of the loss of the grid.

2. The method according to claim 1 wherein injecting a band limited white noise comprises injecting the band limited white noise having an amplitude that is less than an amplitude of the natural noise of the output voltage of the inverter.

3. The method according to claim 1 wherein injecting a band limited white noise comprises injecting the band limited white noise having an amplitude that is not greater than 0.12 rad/sec.

4. The method according to claim 1 wherein injecting a band limited white noise comprises injecting the band limited white noise as a tn-state number sequence which can assume a positive value, a zero value, or a negative value.

5. The method according to claim 1 wherein injecting a band limited white noise comprises generating the band limited white noise by a noise generator at least once in every voltage cycle of the inverter.

6. The method according to claim 1 wherein detecting a frequency error in the output voltage of the inverter comprises activating a positive feedback loop to accumulate a frequency drift upon the loss of the grid.

7. The method according to claim 1 wherein detecting a frequency error in the output voltage of the inverter comprises accumulating a frequency drift using a drift accumulation algorithm to activate a positive feedback when a change in frequency exceeds a predetermined value.

8. The method according to claim 7 wherein detecting a frequency error in the output voltage of the inverter comprises accumulating the frequency drift using the drift accumulation algorithm to activate the positive feedback when the change in frequency exceeds 0.06 rad/sec.

9. The method according to claim 8 wherein perturbing a frequency of the output voltage of the inverter comprises perturbing the frequency of the output voltage of the inverter by the injected noise at a level that insures a frequency drift greater than a predetermined value upon loss of the grid.

10. The method according to claim 9 wherein perturbing a frequency of the output voltage of the inverter comprises perturbing the frequency of the output voltage of the inverter by the injected noise at a level that insures a frequency drift greater than 0.06 rad/sec upon the loss of the grid.

11. The method according to claim 8 wherein detecting a frequency error in the output voltage of the inverter comprises accumulating the frequency drift using the drift accumulation algorithm by a digital integrator.

12. A device for detecting islanding of an inverter connected to
    a grid, the device comprising:
    means for injecting a band limited white noise on an output voltage of the inverter at least once in each voltage cycle;
    means for perturbing a frequency of the output voltage of the inverter by the injected noise upon a loss of the grid; and
    means for detecting a frequency error in the output voltage of the inverter that exceeds a predetermined level indicative of the loss of the grid.

13. The device according to claim 12 wherein the means for injecting a band limited white noise comprises means for injecting the band limited white noise having an amplitude that is less than an amplitude of the natural noise of the output voltage of the inverter.

14. The device according to claim 12 wherein the means for injecting a band limited white noise comprises means for injecting the band limited white noise having an amplitude that is not greater than 60 mHz.

15. The device according to claim 12 wherein the means for injecting a band limited white noise comprises means for injecting the band limited white noise as a tri-state number sequence which can assume a positive value, a zero value, or a negative value.

16. The device according to claim 12 wherein the means for injecting a band limited white noise comprises a noise generator adapted to generate the band limited white noise at least once in every voltage cycle of the inverter.

17. The device according to claim 12 wherein the means for detecting a frequency error in the output voltage of the inverter comprises means for activating a positive feedback loop to accumulate a frequency drift upon the loss of the grid.

18. The device according to claim 12 wherein the means for detecting a frequency error in the output voltage of the inverter comprises means for accumulating a frequency drift using a drift accumulation algorithm to activate a positive feedback when a change in frequency exceeds a predetermined value.

19. The device according to claim 12 wherein the means for perturbing a frequency of the output voltage of the inverter further comprises means for perturbing the frequency of the output voltage of the inverter by the injected noise at a level that insures a frequency drift greater than a predetermined value upon the loss of the grid.

20. The device according to claim 12 wherein the means for perturbing a frequency of the output voltage of the inverter further comprises means for perturbing the frequency of the output voltage of the inverter by the injected noise at a level that insures a frequency drift greater than 0.06 md/sec/cycle upon the loss of the grid.

21. The device according to claim 12 wherein the means for detecting a frequency error in the output voltage of the inverter comprises a digital integrator adapted to accumulate a frequency drift using a drift accumulation algorithm.

22. The device according to claim 12 wherein the means for detecting a frequency error in the output voltage of the inverter further comprises means for clamping the frequency error to an adjustable maximum value so that the frequency drift becomes a linear function of time.

23. The device according to claim 22 wherein the digital integrator is further adapted to reset the frequency drift when the frequency error is below a predefined level indicative of a normal operating condition of the inverter.

24. A method for detecting islanding of a grid connected inverter, comprising:
  determining a phase angle and a frequency of a grid voltage;
  injecting a band limited white noise to the determined phase angle and frequency at least once a cycle;
  determining a frequency error at every cycle;
  resetting a drift if an absolute value of the determined frequency error exceeds a minimum frequency error threshold;
  accumulating the drift if the absolute value of the determined frequency error does not exceed the minimum frequency error threshold;
  adding the drift to the determined phase angle and frequency; and
  generating an inverter current using the drifted frequency and phase angle.

25. The method of claim 24, further comprising:
  setting the absolute value of the determined frequency error equal to a maximum frequency error threshold if the determined frequency error is less than the maximum frequency error threshold.

26. The method of claim 24 wherein determining a phase angle and a frequency of a grid voltage comprises providing the grid voltage to a phase lock loop.

27. A device for detecting islanding of an inverter connected to a grid, the device comprising:
  a phase locked loop coupled to receive grid voltages of the grid, the phase locked loop determining a grid phase angle, a grid frequency and a frequency difference;
  a self-synchronizing controller coupled to the phase locked loop to receive the grid phase angle and coupled to the inverter to receive inverter currents, the self-synchronizing controller determining a frequency correction;
  a drift accumulator coupled to the phase locked loop to accumulate the frequency difference as a drift;
  a band limited white noise generator coupled to sum a band limited white noise on the drift;
  an angle generator coupled to receive the frequency correction from the self-synchronizing controller and coupled to receive a sum of the grid frequency via the phase locked loop and the drift via the drift accumulator, the angle generator determining an inverter phase angle; and
  a current transformer coupled to the angle generator to receive the inverter phase angle and coupled to receive the inverter currents, the current transformer determining actual dq components of the inverter currents; and
  a current controller coupled to the current transformer to receive the actual dq components, and to provide switching signals to the inverter.

28. The device of claim 27 wherein the drift accumulator resets the drift if an absolute value of the frequency difference exceeds a minimum frequency difference threshold.

* * * * *